United States Patent
Kareem (10) Patent No.: US 11,345,276 B2
(45) Date of Patent: May 31, 2022

(54) VEHICLE STATUS INDICATOR

(71) Applicant: Ahmed Kareem, Skokie, IL (US)

(72) Inventor: Ahmed Kareem, Skokie, IL (US)

( * ) Notice: Subject to any disclaimer, the term of this patent is extended or adjusted under 35 U.S.C. 154(b) by 88 days.

(21) Appl. No.: 16/902,772

(22) Filed: Jun. 16, 2020

(65) Prior Publication Data

US 2020/0391656 A1 Dec. 17, 2020

Related U.S. Application Data (60) Provisional application No. 62/862,402, filed on Jun. 17, 2019.

(51) Int. Cl.
*B60Q 1/48* (2006.01)
*F21S 10/06* (2006.01)
*B60Q 1/50* (2006.01)

(52) U.S. Cl.
CPC .......... *B60Q 1/488* (2013.01); *B60Q 1/486* (2013.01); *B60Q 1/503* (2013.01); *F21S 10/06* (2013.01)

(58) Field of Classification Search
CPC ........ B60Q 1/488; B60Q 1/486; B60Q 1/503; B60Q 2900/30; B60Q 1/50; F21S 10/06
USPC ......................................... 340/468, 471–473
See application file for complete search history.

(56) References Cited

U.S. PATENT DOCUMENTS

| | | | | |
|---|---|---|---|---|
| 4,631,516 A * | 12/1986 | Clinker | .................. | B60Q 1/503 340/464 |
| 5,652,565 A * | 7/1997 | Salcedas | ................ | B60Q 1/302 340/467 |
| 5,905,434 A * | 5/1999 | Steffan | ..................... | B60Q 1/50 340/464 |
| 6,300,870 B1 * | 10/2001 | Nelson | ................... | B60Q 1/503 340/463 |
| 6,553,285 B1 * | 4/2003 | Bahmad | ................ | B60Q 1/503 116/42 |
| 6,867,692 B2 * | 3/2005 | Weatherspoon | ....... | B60Q 1/503 315/77 |
| 7,020,992 B1 * | 4/2006 | Christie | .................. | G09F 21/04 40/593 |
| 7,095,318 B1 * | 8/2006 | Bekhor | .................... | B60Q 1/26 340/485 |
| 7,378,948 B2 * | 5/2008 | Somuah | ................ | B60Q 1/503 180/167 |

(Continued)

*Primary Examiner* — Eric Blount
(74) *Attorney, Agent, or Firm* — Fox Rothschild LLP; Kari L. Barnes (57) ABSTRACT

A device for use with a vehicle that includes a cabinet having a plurality of sidewalls that can define at least a portion of an interior region of the cabinet. A display screen is coupled to a portion of the cabinet, at least one side of the display screen being positioned to face outwardly away from the interior region and have indicia that is visible from a location remote from both the cabinet and the vehicle. A light source can be positioned within the interior region adjacent to the display screen that is configured to selectively illuminate at least a portion of at least one of the display screen and the indicia. The device can further include a controller that is electrically coupled to the light source and a trigger assembly. The controller can be configured to initiate operation of the light source in response to receipt of a communication from the trigger assembly that is indicative a change in status of the vehicle.

18 Claims, 5 Drawing Sheets

(56) References Cited

U.S. PATENT DOCUMENTS

| | | | | |
|---|---|---|---|---|
| 7,449,998 B1 * | 11/2008 | Au | ................. | G09F 21/042 |
| | | | | 340/468 |
| 7,696,865 B1 * | 4/2010 | Robinson | ............... | B60Q 1/503 |
| | | | | 340/479 |
| 7,952,489 B1 * | 5/2011 | Paterno | ................. | B60Q 1/503 |
| | | | | 340/815.4 |
| 8,136,280 B2 * | 3/2012 | Spelman | ................... | G09F 7/00 |
| | | | | 40/586 |
| 8,954,252 B1 * | 2/2015 | Urmson | ................ | G08G 1/167 |
| | | | | 701/70 |
| 9,343,002 B2 * | 5/2016 | Hagemann | ........... | G09F 13/005 |
| 9,799,241 B2 * | 10/2017 | Stockton | ............... | G09F 13/005 |
| 9,868,389 B2 * | 1/2018 | Williams | ................. | B60Q 1/50 |
| 9,902,311 B2 * | 2/2018 | Sweeney | ............... | B60Q 5/005 |
| 9,969,326 B2 * | 5/2018 | Ross | ....................... | B60Q 1/50 |
| 10,000,152 B1 * | 6/2018 | Scalea | ................... | B60Q 9/008 |
| D825,000 S * | 8/2018 | Owusu-Ansah | ............... | D20/10 |
| 10,261,513 B2 * | 4/2019 | Reiley | ..................... | B60Q 1/26 |
| 10,328,847 B2 * | 6/2019 | Yang | ....................... | B60Q 1/50 |
| 10,569,702 B2 * | 2/2020 | Baker | .................. | G07C 5/0825 |
| 10,614,715 B2 * | 4/2020 | Sweeney | ............... | B60Q 5/005 |
| 11,001,196 B1 * | 5/2021 | Alexander | .............. | B60Q 1/50 |
| 11,079,765 B2 * | 8/2021 | Reiley | ................. | G05D 1/0214 |
| 2017/0120804 A1 * | 5/2017 | Kentley | ............... | B60W 30/08 |
| 2018/0334089 A1 * | 11/2018 | Huang | .................. | B60Q 5/006 |

\* cited by examiner

FIGURE 5

VEHICLE STATUS INDICATOR

CROSS REFERENCE TO RELATED APPLICATIONS

The present application claims the benefit of U.S. Provisional Patent Application Ser. No. 62/862,402, filed Jun. 17, 2020, which is incorporated herein by reference in its entirety.

FIELD OF INVENTION

The present invention relates to a status indicator for vehicles, and more particularly, to a visual status indicator for a vehicle for detection and communication of information to individuals outside of the vehicle regarding at least a temporary movement or non-movement status of the vehicle.

BACKGROUND

The safety of at least those outside of a vehicle often involves the prediction and/or attempted understanding of the intentions and/or future actions of a vehicle's driver. Yet, misunderstanding or incorrectly assuming a driver's intentions can, at least in certain circumstances, have potentially catastrophic consequences, including serious bodily injury and/or property damage. For example, it is often difficult for those outside of a vehicle to predict that a driver may be intending to proceed with pulling into parking spot. Additionally, it can be difficult to realize that a driver may be driving in a particular manner because that driver is actively looking for a place to park the driver's vehicle. Also, for example, often one may believe they can assume that an automobile will not have a change in status, such as, for example, remain in a stopped position based on the duration that the automobile has been stopped and/or in view of the location of the automobile in the roadway. Based on such potential misunderstandings or incorrect assumptions, someone outside of the vehicle, such as, for example, a pedestrian or driver of another vehicle, may move into a relatively close, and potentially unsafe, proximity to the vehicle as they attempt to move past the vehicle. However, if the predictions or assumptions of the pedestrian or driver of the moving vehicle are incorrect, then the stopped vehicle may hit the pedestrian or other vehicle as the previously stopped vehicle begins to move, such as, for example, as the vehicle begins to move into, or out of, a parking spot. Conversely, if other drivers fail to recognize the driver is intending to remain in the stopped or parked location, and/or that the driver is awaiting to move the vehicle into a parking stop, the other drivers may wait with their vehicles in a stopped position, which can result in traffic congestion and an increase in driver frustration.

Additionally, in at least many urban areas, there is often a lack of open area or spaces for an automobile to at least temporarily stop or park. Thus, in such situations, a driver may stop the automobile he/she is driving in at least a portion of a driving lane that is close to a side of the road, or along other vehicles that are parked along a side of the road, also commonly referred to as "double parking". Many times, the driver intends for such double-parking to be temporary, such as, for example for the driver to temporarily stop the automobile while awaiting for an individual to enter/exit the automobile, or for the driver to temporarily exit the vehicle. However, again, such actions often result in pedestrians or other drivers having to predict or assume the driver's intentions, particularly as the driver may unexpectedly begin to slow the movement of the vehicle, which, again, can create dangerous and frustrating situations for at least those individuals that are outside of the slowing and/or stopped vehicle.

BRIEF SUMMARY

An aspect of an embodiment of the present application is a device for use with a vehicle, the device comprising a cabinet having a plurality of sidewalls, the plurality of sidewalls defining at least a portion of an interior region of the cabinet. The device also includes a display screen coupled to a portion of the cabinet, at least one side of the display screen positioned to face outwardly away from the interior region. Additionally, at least one side of the display screen can have indicia that is visible from a location remote from both the cabinet and the vehicle, the indicia configured to provide a visual indication of an operation status of the vehicle. The device further can include a light source that is coupled to the cabinet and is positioned adjacent to the display screen, the light source configured to selectively illuminate at least a portion of at least one of the display screen and the indicia. The device can also include a controller that is electrically coupled to the light source and a trigger assembly that is communicatively coupled to the controller. Further, the controller can be configured to initiate operation of the light source in response to receipt of a communication from the trigger assembly, the communication being indicative a change in status of the vehicle.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1A:
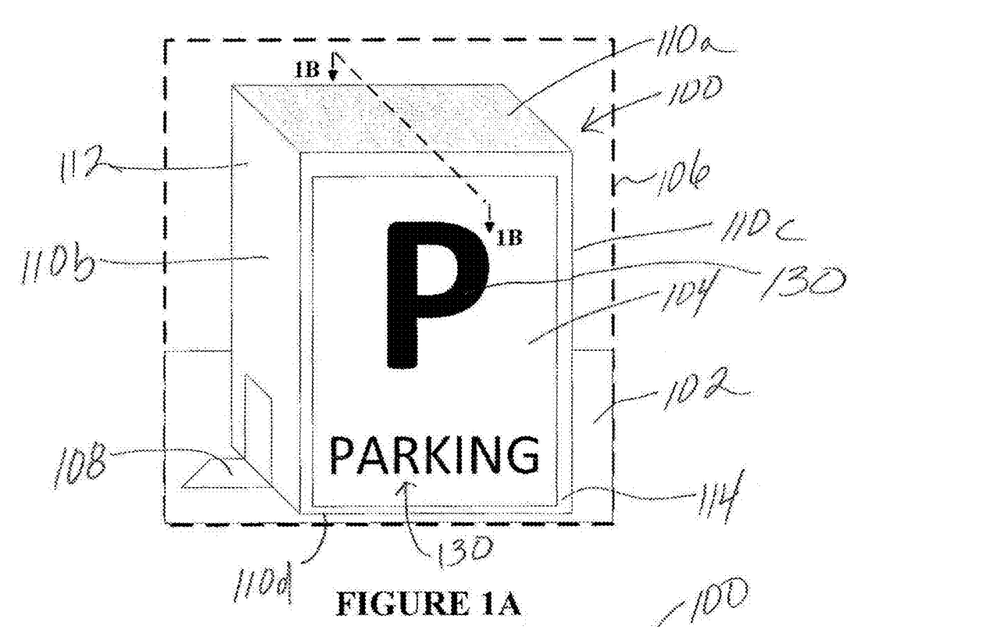
FIG. 1A illustrates a front view of a status indicator of a status indicator assembly, the status indictor being positioned on a rear deck of a vehicle so as to be viewable through a rear window of the vehicle.

FIG. 1A illustrates a front view of an exemplary status indicator 100 for a status indicator assembly according to an embodiment of the subject application. For purposes of illustration, the status indicator 100 is depicted as being positioned on, or otherwise above, a rear deck or package shelf 102 of a vehicle such that a display screen 104 of the status indicator 100 is viewable to those outside of the vehicle through a rear window 106 of the vehicle. The status indicator 100 can be used in a variety of different types of vehicles, including, but not limited to petrol, electrical, or man-powered vehicles, among other vehicles. For example, the status indicator 100 can be used in passenger, delivery, service, and/or construction automobiles, trucks, and vans, among other vehicles. Additionally, the status indicator 100 can be positioned in a variety of different positions within a cabin of the vehicle so as to be viewable to those outside of the vehicle, including, for example, positioned adjacent to a rear, front, and/or side window. Additionally, according to other embodiments, rather than being positioned within the cabin of the vehicle, the status indicator 100 can instead be constructed for placement at an external location along the vehicle, including, but not limited to, atop/against a trunk, hood, or roof of the vehicle, or against a bumper or door of the vehicle, among other positions and locations.

Figure 1B:
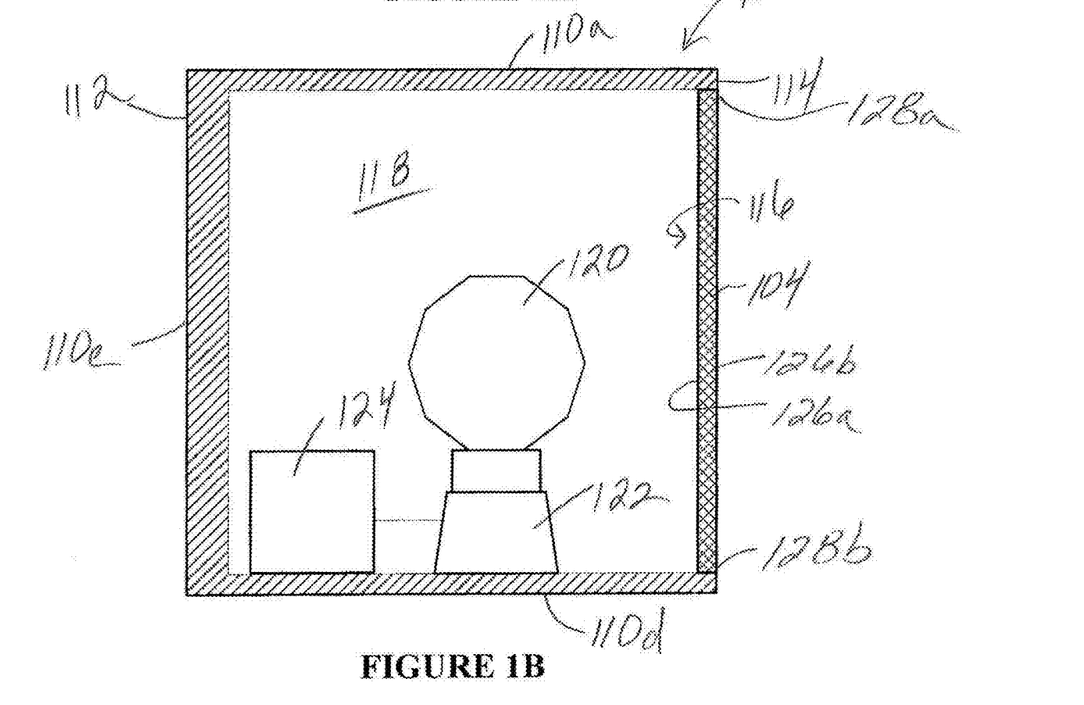
FIG. 1B illustrates a partial cross sectional view of the status indicator, taken along line 1B-1B of FIG. 1A.

As shown by at least FIGS. 1A and 1B, according to certain embodiments, the status indicator 100 can include a plurality of sidewalls 110a-e that can form a cabinet 112. Moreover, the sidewalls 110a-e can generally define an interior region 118 of the cabinet 112 that can be sized to house various components of the status indicator 100, including, for example, a light source 120 and associated fixture 122, and/or a controller 124, among other components. While FIG. 1B depicts the sidewalls 110a-e as being part of a monolithic, or unitary, structure, according to certain embodiments, one or more of the sidewalls 110a-e, such as, for example, a rear sidewall 110a, can be removable, or otherwise displaceable, from the other sidewalls 110a-d. For example, according to certain embodiments, the rear wall 110e can be secured in position about the cabinet 112 via one or more mechanical fasteners, including, but not limited to, a hinge, pin, screw or bolts, as well as a combination thereof, among other types of fasteners and connections.

The status indicator 100 may, or may not, be securely attached to the vehicle via one or more attachment mechanisms 108, as shown, for example, in FIG. 1A. For example, according to certain embodiments, the status indicator 100 can be secured to the rear deck 102, among other portions of the vehicle, using an attachment mechanism 108 in a variety of manners, including, but not limited to, via use of hook and loop material, double sided tape, mechanical fasteners, suction cups, magnets and/or adhesives, among other manners of securing the status indicator 100 to the vehicle. For example, the status indicator 100 shown in FIG. 1A is depicted as being positioned such that a bottom sidewall 110d of the plurality of sidewalls 110a-e of the cabinet 112 is either directly or indirectly against the rear deck 102 of the vehicle and an attachment mechanism 108, such as, for example, an adhesive tape, extends from another sidewall 110b of the cabinet 112 to the rear deck 102. However, the status indicator 100 can be coupled to the vehicle, and/or the attachment mechanism 108 can be coupled to the status indicator 100, at a variety of other locations. For example, according to certain embodiments, an attachment mechanism 108 can be positioned such that a face portion 114 of the cabinet 112 that is generally adjacent to the opening 116 of the cabinet 112 is coupled to the vehicle. Alternatively, a top wall 110a of the plurality of sidewalls 110a-e can be configured such that the status indicator 100 can be suspended within the vehicle via an attachment mechanism 108. Alternatively, according to other embodiments, the status indicator 100 can be indirectly coupled to the vehicle, such as, for example, via an attachment mechanism 108 in the form of a stand, mount, or bracket that extends from a portion of the vehicle, and which receives at least placement of the status indicator 100.

While the embodiment depicted in at least FIGS. 1A and 1B has a generally square or rectangular shape or configuration, the cabinet 112 can have a variety of other shapes and configurations, including, but not limited to, circular, cylindrical, triangular, polygonal, and non-circular, as well as combinations thereof. Accordingly, the number of sidewalls 110a-e can also vary. According to certain embodiments, the cabinet 112 can have a height, such as generally between opposing sidewalls 110a, 110d of the cabinet 112, of around 1 inch to around 12 inches, a width, such as, for example, generally between opposing sidewalls 110b, 110c, of around 1 inch to around 12 inches, and a length generally between the face portion 114 and rear wall 110e of the cabinet 112 of around 1 inch to 12 inches. More specifically, the cabinet can have a height of about 4½ inches, a width of about 4½ inches, and a length of about one-eighth inch to about one inch.

According to the illustrated embodiment, one side of the cabinet 112 can include an opening 116 that is sized to receive placement of a display screen or monitor 120. Further, according to certain embodiments, the opening 116 can be in fluid communication with the interior region 118 such that, upon removal of the display screen 104, the interior region 118 can be accessed via passage through at least the opening 116.

The display screen 104 can have a first side 126a and a second side 126b, the first side 126a being adjacent to the interior region 118 and the second side 126b facing outwardly away from the cabinet 112. Further, according to certain embodiments, the display screen 104 can extend between a first end 128a and a second end 128b of the display screen 104, the first and second ends 128a, 128b being positioned generally adjacent to opposing sidewalls 110a, 110d of the cabinet 112. Further, according to certain embodiments, the display screen 104 can be sized to generally occupy the region of the opening 116 so as to cover most, if not all, of the opening 116. While FIG. 1B illustrates the display screen 104 as abutting opposing sidewalls 110a, 110d of the cabinet 112, according to other embodiments, at least a portion of one or more sidewalls 110a-d of the cabinet 112 can overlap at least a portion of the first side 126a and/or second side 126b of the display screen 104. Additionally, the display screen 104 can be secured to the cabinet 112 in a variety of different manners, including, but not limited to, via an adhesive, press fit, clamped connection, interference fit, and/or via use of one or more mechanical fasteners, including, but not limited to screws, bolts, and/or pins, among other manners of connection.

A variety of different types of materials and/or devices can be utilized for the display screen 104. For example, according to certain embodiments, the display screen 104 can be constructed from a transparent, semi-transparent, translucent, or semi-translucent material such that, when the first side 126a of the display screen 104 is illuminated via operation of the light source 120, at least a portion of the light passes through the display screen 104 so that a person looking at the second side 126b of the display screen 104 can readily recognize that the display screen 104 is being illuminated. Moreover, the degree of light that passes through the display screen 104 can be sufficient to draw the visual attention of the individuals in other vehicles, or outside of the vehicle, to the illuminated display screen 104 of the status indicator 100.

As shown by at least FIG. 1A, the display screen 104 can include indicia 130 that can provide one or more status indications, such as, for example, status indications relating to whether movement of the vehicle is at least being temporarily ceased, the transmission of the vehicle has been placed in a parked position, and/or the driver intends or is in the process of parking the vehicle. A variety of different types of indicia 130 can be utilized, including one or more alphanumeric characters, including, but not limited to, letters, words, and/or symbols. For example, according to the illustrated embodiment, the indicia 130 can be configured to convey information regarding the vehicle having a parked status, a non-moving status, and/or a status indicative of the vehicle being in the process of being parked. Thus, as demonstrated by the exemplary embodiment depicted in FIG. 1A, according to a certain embodiment, the indicia 130 can include both a relatively enlarged letter "P" and the word "PARKING".

The indicia 130 can be provided to the display screen 104 in a variety of different manners. For example, according to certain embodiments, the indicia 130 can be printed, painted, or adhered to the first side 126a and/or second side 126b of the display screen 104. For example, the indicia 130 can, according to certain embodiments, be provided by one or more decal(s) that is/are adhered to the second side 126b of the display screen 104. Moreover, according to certain embodiments, the indicia 130 can be provided by a generally opaque material such that, as the display screen 104 is illuminated by the light source 120, the contrasts created between the light passing through the display screen 104 but generally not through the opaque indicia 130 can enhance the detection of the indicia 130, and moreover, the message or information being provided by the indicia 130. According to other embodiments, at least portions of the display screen can be constructed from, or include, opaque material, while the indicia 130 is formed from transparent, semi-transparent, translucent, or semi-translucent material. Alternatively, according to other embodiments, the indicia 130 can extend through the display screen 104, such as, for example, through a portion of both the first and second sides 126a, 126b of the display screen 104, as well as the portion of the display screen 104 positioned therebetween. According to such an embodiment, the display screen 104 can be constructed from an opaque material and/or a material having limited transparency such that operation of the light source 120 can result in illumination of the indicia 130 and limited, if any, illumination of the remainder of the display screen 104.

A variety of types of lights can be utilized for the light source 120. For example, according to certain embodiments, the light source 120 can be an incandescent light bulb or a LED light, which is operably connected to a corresponding light fixture 122. According to other embodiments, the light source 120 can be configured, such as, for example, shaped and/or positioned, to provide the indicia 130. For example, according to certain embodiments, the light source 120 can be a plurality of strips of LED lights that are arranged in a manner that forms the letters and/or symbols of the indicia 130. According to such embodiments, the light source 120 can be positioned within the interior region 118 of the cabinet 112 and adjacent to the first side 126a of the display screen 104, positioned in one or more openings that extend through the display screen 104, and/or positioned adjacent to the second side 126b of the display screen 104.

While embodiments described herein have discussed the use of a light source 120 and display screen 104, according to other embodiments, the screen may be a monitor or display, such as, for example, a LED display. Alternatively, according to other embodiments, the light source 120 can be a projector or other light emitter that can project the indicia 130 upon the display screen 104.

Figure 2:
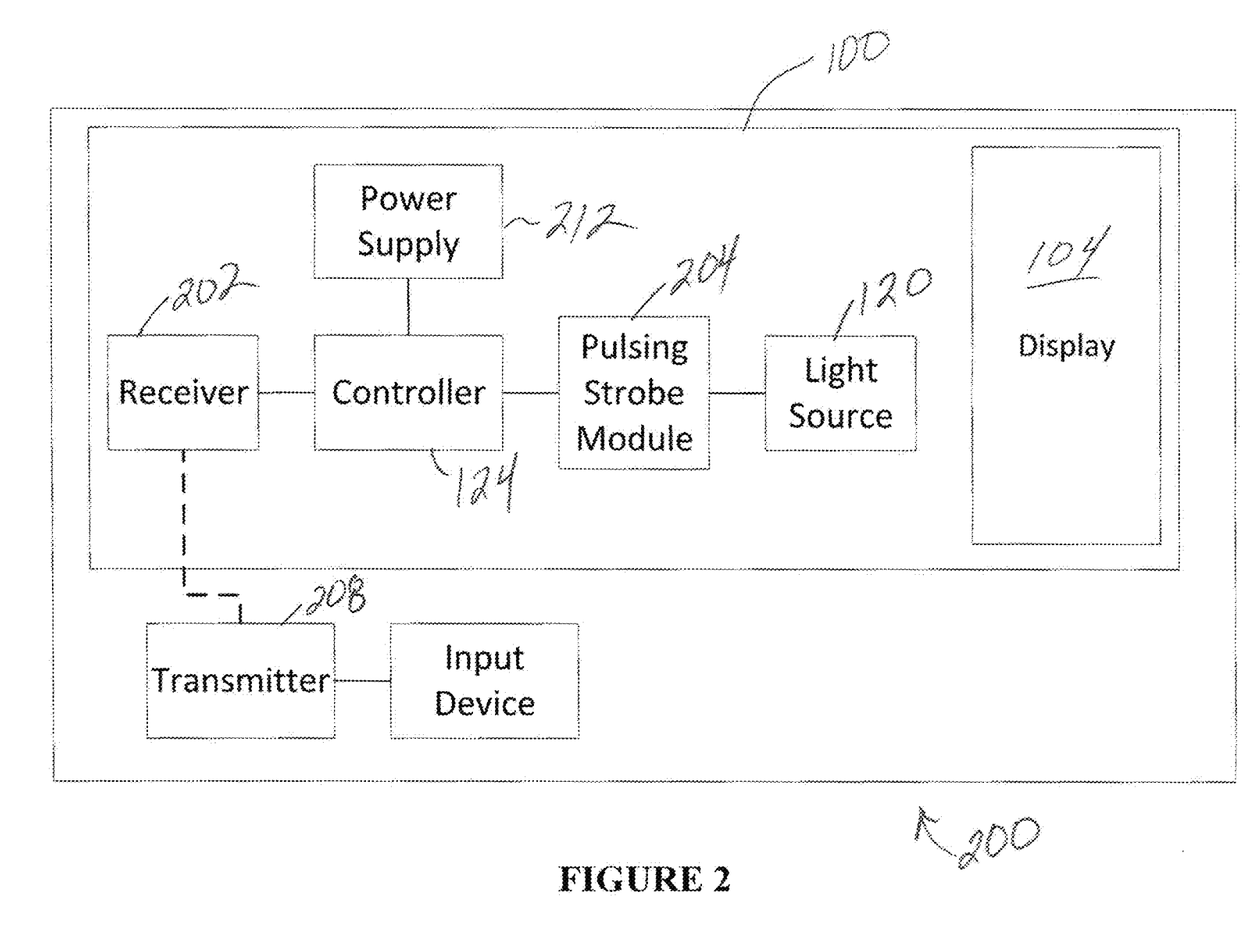
FIG. 2 illustrates an exemplary block diagram of a status indicator assembly according to a first illustrated embodiment of the subject application.

Operation of the light source 120 can be controlled in a variety of different manners. For example, as shown in FIG. 2, the indicator status assembly 200 can include a controller 124 that is configured to control the operation of the light source 120. According to certain embodiments, such control can include the controller 124 controlling when and/or how long electrical power is, or is not, supplied to light source 120 so as to control when, and/or how long, the light source 120 receives electrical power that can illuminate the light source 120. As discussed below with respect to at least FIGS. 2-5, operation of the controller 124, and thus operation of the light source 120, can be controlled using a variety of different trigger assemblies, including, but not limited to, trigger assemblies that are configured to accommodate selective operation of the indicator status assembly 200, 300, 400, 500 by the driver of the vehicle (among other individuals), and/or based on information obtained by one or more sensors, modules, or controllers, including, for example, sensors that can provide data used to detect a the status, position, and/or movement of the vehicle, status indicator 100, and/or one or more transmission components, among other vehicle component and manners of control.

FIG. 2 illustrates an exemplary block diagram of a status indicator assembly 200 according to a first illustrated embodiment of the subject application. As shown, according to the exemplary embodiment depicted in FIG. 2, the status indicator assembly 200 can include a receiver 202, a controller 124, and a pulsing strobe module 204. While FIG. 2 illustrates each of the receiver 202, controller 124, and pulsing strobe module 204 as separate components, according to certain embodiments, two or more of these components can be combined and/or housed together. Further, according to certain embodiments, the pulsing strobe module 204 can be, or otherwise provide the function of, the controller 124. For example, according to certain embodiments, the pulsing strobe module 204 can be a circuit that can receive an input supply of electrical power and output the electrical power in a form and/or at a rate that can facilitate the light source 120 being relatively rapidly being transitioned between being turned on and being turned off so that the light emitted from the light source 104 is emitted in a manner that provides a strobe or pulsing light effect.

A variety of different devices can be utilized as the receiver 202. For example, according to certain embodiments, the receiver 202 can be terminals that are operably connected to wires or cables that can facilitate the receipt of a signal, such as, for example, an electrical current, following activation of a trigger assembly of the status indicator assembly 200, such as, for example, an input device 206 of the status indicator assembly 200. According to other embodiments, the receiver 202 can be configured to receive a wireless signal following activation of the input device 206, as indicated by the broken line connecting a transmitter 208 of the status indicator assembly 200 with the receiver 202. For example, according to certain embodiments, the receiver 202 can be a Bluetooth receiver.

As shown in FIG. 2, according to certain embodiments, the assembly 200 can include an input device 206, such as, for example, a button, switch, touch pad, tablet, and/or smartphone or other mobile device, among other devices, that can be operated by a driver of the vehicle or other individual. According to certain embodiments, operation of the status indicator assembly 200 can occur upon operable activation of the input device 206, such as, for example, upon depression of a button, flipping of a switch, and/or operable engagement with an associated icon on a touch screen. As shown by the embodiment depicted in FIG. 2, upon activation of the input device 206, a signal can be communicated, such as, for example, via the transmitter 208, to the receiver 202 that is coupled to the controller 124. Alternatively, according to certain embodiments, activation of the input device 206 can close a circuit, or otherwise facilitate the delivery of an electrical signal or current, to the receiver 202 and/or to the controller 124 and result in a signal being communicated via a cable or wire from the receiver 202 to a transmitter 208. According to certain embodiments, both the transmitter 208 and the receiver 202 can be terminals that are coupled to such a cable(s) or wire(s).

While the input device 206 is described above in terms of initiating activation of the light source 120 so as to communicate a status of the vehicle, according to certain embodiments, the input device 206 can also be used to terminate current operation of the light source 120. For example, after engaging the input device 206 a first time to initiate operation of the light source 120, the driver can engage the input device 206 a second time such that another signal is transmitted that provides, or is otherwise utilized, to stop operation of the light source 120. Alternatively, or additionally, according to other embodiments, the status indicator assembly 200 can include a timer that can be utilized to limit the time period during which the light source 120 is operated after the light source 120 has been activated by operation of the input device 206. For example, activation of the light source 120 via operation of the input device 206 can trigger operation of a timer, and after a predetermined time period, as measured via use of the timer, the controller 124 can end operation of the light source 120, thereby providing for an automatic stoppage in the illumination of the light source 120.

As shown in FIG. 2, the controller 124 can be electrically coupled to a power supply 210. According to certain embodiments, the power supply 210 is a replaceable and/or rechargeable battery, such as, for example, a lithium-ion battery. According to other embodiments, the power supply 210 is provided by one or more photovoltaic cells, among other renewable energy sources, and/or an associated battery that is coupled to, and charged via operation of, the photovoltaic cells. According to other embodiments, the power supply 212 can be provided by the electrical power system of the vehicle, such as, for example, via the controller 124 being electrically coupled to the battery of the vehicle.

Figure 3:
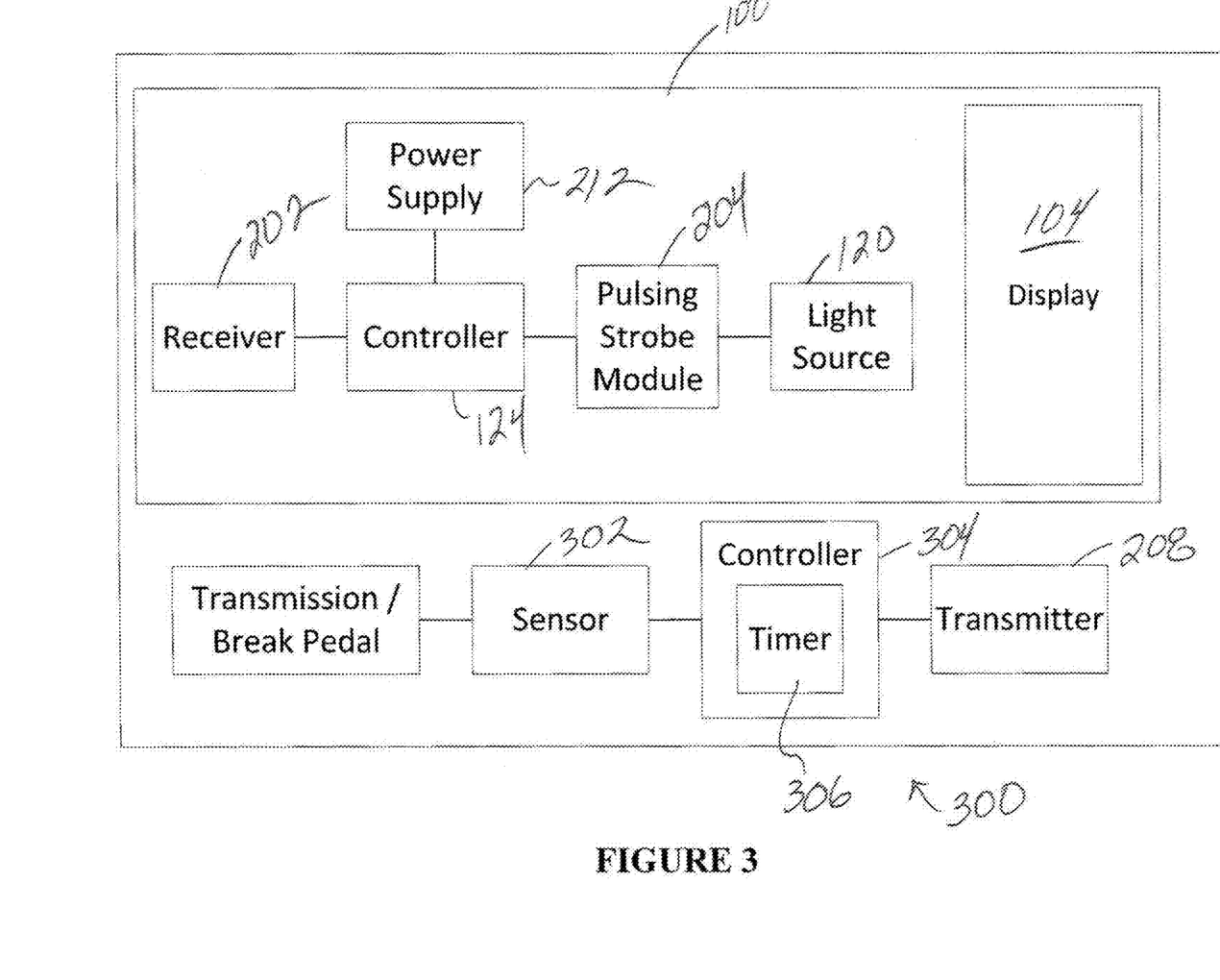
FIG. 3 illustrates an exemplary block diagram of a status indicator assembly according to a second illustrated embodiment of the subject application.

FIG. 3 illustrates an exemplary block diagram of a status indicator assembly 300 according to a second illustrated embodiment of the subject application. According to the embodiment depicted in FIG. 3, the trigger assembly can include a sensor 302 that can be utilized in connection with determining whether the vehicle is in a parked or non-moving position and/or condition, or whether the driver is in the process of parking the vehicle. For example, according to certain embodiments, the sensor 302 can comprise one or more sensors, such as, for example, position and/or acceleration sensors, that can, for example, indicate the position of the brake pedal and/or the status of a transmission of the vehicle, including, for example, a position of the transmission shifter and/or shifter cable, among detection of the position and/or status of other components of the vehicle. More specifically, for example, one or more sensors may be utilized to detect when the brake pedal has been depressed to a parked position, or the shifter or other portion of the transmission system has been moved to a position associated with the vehicle transmission being placed in a park position or condition. Alternatively, one or more sensors 302 maybe utilized to detect a speed and direction of movement of the vehicle that may be associated with the vehicle being in the process of being parked, such as, for example, the vehicle moving in a direction and/or speed associated with the parking of a vehicle, including, for example, speeds and directions often associated with parallel parking of a vehicle.

According to certain embodiments, the information from the sensor 302 can be provided to an input controller 304, which can, for example, include a timer 306. Thus, according to certain embodiments, upon receipt of information from the sensor 302 indicating the vehicle is in a non-moving condition, such as, for example, via a user depressing the brake pedal or the transmission being placed in a parked condition, the input controller 304 can initiate activation of the timer 306. After expiration of a predetermined time period, based on information obtained using the timer 306, in which the status of the vehicle has remained unchanged, the input controller 304 can communicate a signal, such as, for example, via the transmitter 208, to the receiver 202, indicating that the status indicator assembly 300 is to activate the light source 120. As discussed above, such activation can include illuminating the light source 120 in a manner that can bring visual attention to at least the indicia 130 so as to communicate to others outside of the vehicle a status of the vehicle, such as, for example, that the vehicle is being parked, and/or is or will be remaining in a parked or non-moving condition.

Similar to the embodiment depicted in FIG. 2, the embodiment depicted in FIG. 3 can terminate operation of the light source 120, and more specifically cease illumination of the light source 120, in a variety of different manners. For example, according to certain embodiments, the sensor(s) 302 can detect movement and/or a change in position that can indicate that a change in status of the vehicle. For example, according to certain embodiments, displacement of the brake pedal from a stopped position, such as, for example, movement or a change in position associated with the driver releasing a depressed brake pedal, and/or movement or positioning associated with the shifting of the shift lever of the vehicle's transmission, can be detected by the sensor(s) 302 and communicated to the input controller 304.

Such information can then be used by the controller 304 to generate a signal that facilitates an end in the operation of the light source 120.

Figure 4:
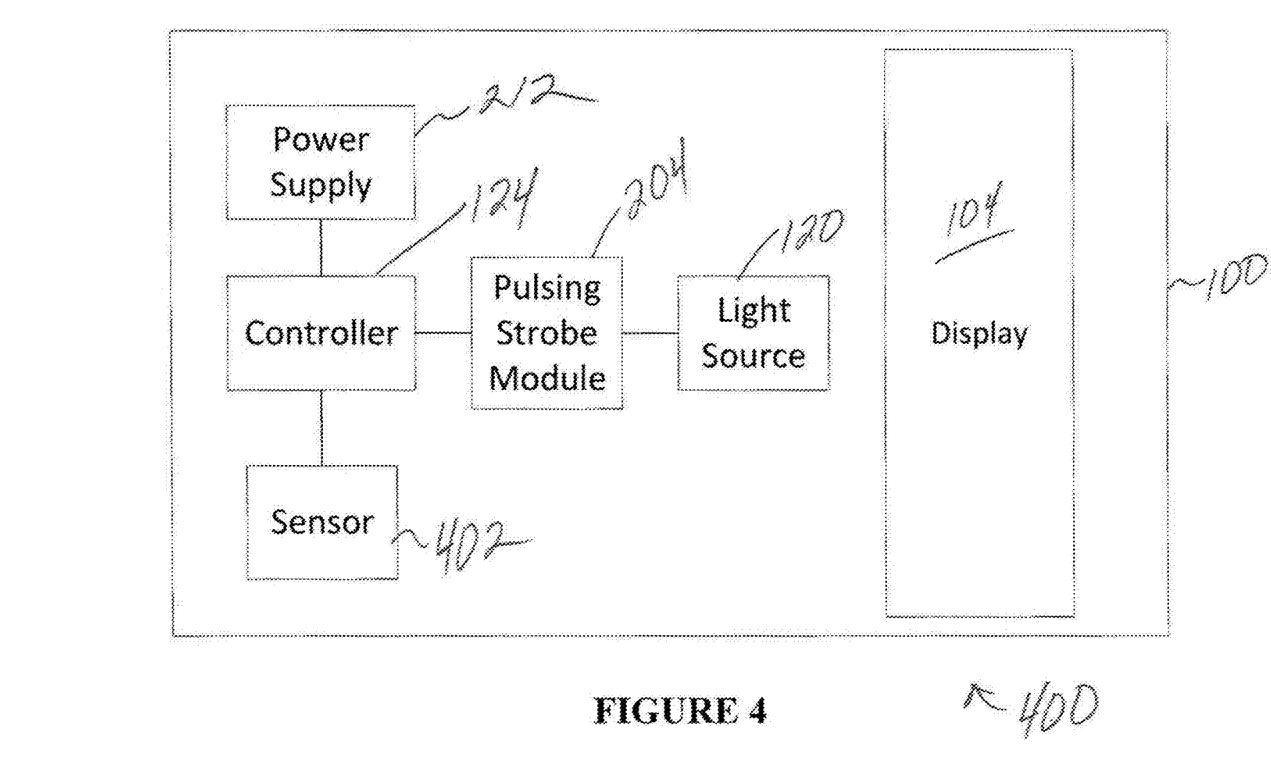
FIG. 4 illustrates an exemplary block diagram of a status indicator assembly according to a third illustrated embodiment of the subject application.

FIG. 4 illustrates an exemplary block diagram of a status indicator assembly 400 according to a third illustrated embodiment of the subject application. Unlike the sensor 302 depicted in FIG. 3, the trigger assembly for the status indicator assembly 400 depicted in FIG. 4 can comprise a sensor 402 that can be directly or indirectly mounted, or otherwise attached to, the status indicator 100. A variety of sensors 402 can be utilized that can provide information regarding the status of the status indicator 100 and/or the associated vehicle. For example, according to certain embodiments, the sensor 402 can detect movement, acceleration, and/or vibrations, among other sensed parameters. According to such embodiments, the controller 124 can be configured to detect, based on information provided by the sensor 402, a status of the vehicle, such as, for example, whether the vehicle is at a parked or stopped position. For example, the controller 124 can be configured to determine that data provided by the sensor 402 that is below a predetermined threshold can be indicative of the vehicle being at a parked or stopped position. Additionally, according to certain embodiments, the controller 124 can include a timer that the controller 124 utilizes to determine whether sensed data provided by the sensor 402 remains below a predetermined threshold for a predetermined time period, as indicated by use of the timer. According to such embodiments, in the event the controller 124 determines that the sensed data provided by the sensor 402 has remained below a predetermined threshold for a predetermined time period, the controller 124 can facilitate the transmission of a signal or electrical current that can initiate operation of the light source 120. Additionally, according to certain embodiments, upon the sensor 402 providing data that is above the predetermined threshold, and/or which is above the predetermined threshold for another predetermined period of time, as determined using the timer, the controller 124 can be operated to cease operation of the light source 120.

Figure 5:
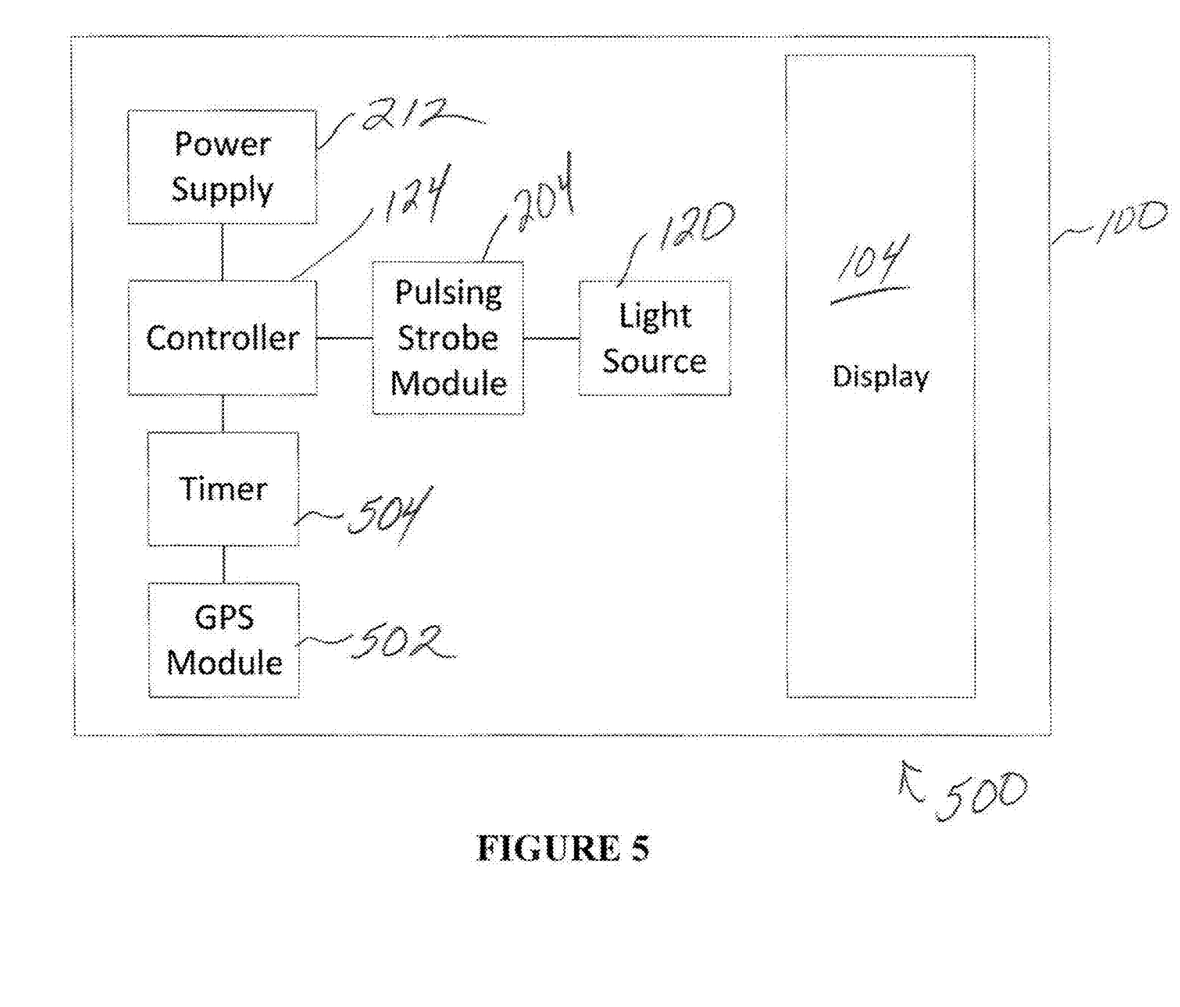
FIG. 5 illustrates an exemplary block diagram of a status indicator assembly according to a fourth illustrated embodiment of the subject application.

FIG. 5 illustrates an exemplary block diagram of a status indicator assembly 500 according to a fourth illustrated embodiment of the subject application. FIG. 5 is similar to that of FIG. 4, with the exception that FIG. 5 depicts the previously discussed timer, and the trigger assembly utilizes a global positioning system (GPS) module 502. Although the GPS module 502 is depicted as being positioned within the status indicator 100, the GPS module 502 can be positioned at a variety of locations about the vehicle. Additionally, rather than being a separate component, according to certain embodiments, the GPS module 502 can be part of the overall navigation system of the vehicle and/or part of a central navigation system for the vehicle. Alternatively, according to other embodiments, the GPS module 502 can be provided by a secondary device, such as, for example, a smartphone or tablet, among other devices, that can be communicatively coupled to the status indicator assembly 500, including, for example, via a wired or wireless connection.

According to certain embodiments, the controller 124 can utilize information from the GPS module 502 to detect a status of the vehicle, as well as information from the timer 504 to determine the duration that the vehicle has had such a status. For example, the controller 124 can utilize information from the GPS module 502 to detect whether there has, or has not, been a change in the position of the vehicle to determine whether the vehicle is parked or in a non-moving condition. According to certain embodiments, upon detection of a lack of movement of the vehicle for a predetermined period of time, as determined using information from the timer 504, the controller 124 can generate a signal to initiate the operation of the light source 120. Further, upon receipt of information regarding a change in the status or position of the vehicle, such as, for example, from information through use of the GPS module 502, upon expiration of another predetermined period of time, as determined using the timer 504, and/or other information the controller 124 can generate a signal to cease operation of the light source 120.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A device for use with a vehicle, the device comprising:
   a cabinet having a plurality of sidewalls, the plurality of sidewalls defining at least a portion of an interior region of the cabinet;
   a display screen coupled to a portion of the cabinet, at least one side of the display screen positioned to face outwardly away from the interior region, the at least one side of the display screen having indicia that is visible from a location remote from the cabinet, the indicia providing a visual indication of an operation status of the vehicle;
   a light source coupled to the cabinet and positioned adjacent to the display screen, the light source configured to selectively illuminate at least a portion of at least one of the display screen and the indicia;
   a controller electrically coupled to the light source; and
   a trigger assembly communicatively coupled to the controller, the controller configured to initiate operation of the light source in response to receipt of a communication from the trigger assembly, the communication indicative of a status of the vehicle, the trigger assembly comprising a global position system module and a timer, the controller configured to determine whether data provided by the global position system module satisfies a predetermined threshold for a first predetermined time period, and wherein the controller is further configured to generate a first signal to facilitate operation of the light source upon determination by the controller that the predetermined threshold has been satisfied for the first predetermined time period.

2. The device of claim 1, wherein the trigger assembly includes an input device that is positioned generally remotely from the cabinet, the input device being configured for selective activation by a driver of the vehicle.

3. The device of claim 2, wherein the input device comprises a button or a switch.

4. The device of claim 2, wherein the trigger assembly further includes a transmitter electronically coupled to the input device, the transmitter being configured to wirelessly transmit the communication to the controller.

5. The device of claim 4, wherein the controller is electronically coupled to a receiver, the receiver configured to receive the communication from the transmitter.

6. The device of claim 1, further comprising a pulsing strobe module, the pulsing strobe module configured to operate the light source with a strobe or pulsing light effect.

7. The device of claim 1, wherein the operation status of the vehicle is a parking status of the vehicle.

8. The device of claim 1, wherein the operation status of the vehicle is a parked status of the vehicle.

9. The device of claim 1, wherein the controller is configured to cease an operation of the light source upon expiration of a predetermined time period using the timer.

10. The device of claim 1, wherein the display screen is semi-translucent, and wherein the indicia comprises one or more alphanumeric characters formed form an opaque material along one or more portions of the display screen.

11. The device of claim 1, wherein the display screen is constructed form an opaque material, and wherein the indicia is formed by an absence of opaque material along one or more portions of the display screen.

12. The device of claim 1, wherein the trigger assembly further comprises one or more sensors, an input controller, the one or more sensors configured to detect at least one of a movement and a position of at least one of the device and one or more components of the vehicle, the input controller configured to determine whether data provided by the one or more sensors satisfies a second predetermined threshold for a second predetermined time period, and wherein the input controller is further configured to generate a second signal to facilitate operation of the light source upon determination by the input controller that the second predetermined threshold has been satisfied for the second predetermined time period.

13. The device of claim 12, wherein the input controller is configured to generate a third signal to cease operation of the light source upon a determination by the input controller that the second predetermined threshold is no longer satisfied.

14. The device of claim 13, wherein the input controller is configured to generate a third signal to cease operation of the light source upon expiration of a third predetermined time period.

15. The device of claim 1, wherein the trigger assembly comprises one or more sensors coupled to the cabinet, the one or more sensors configured to detect at least one of a movement and a position of at least one of the device and one or more components of the vehicle, the controller configured to determine whether data provided by the one or more sensors satisfies a second predetermined threshold, and wherein the controller is further configured to generate a second signal to facilitate operation of the light source upon determination by the controller that the second predetermined threshold has been satisfied.

16. The device of claim 1, wherein the global position system module comprises a navigation system of the vehicle.

17. The device of claim 1, wherein the global position system module comprises a mobile device that is wirelessly connected to the controller.

18. A system, comprising:
a vehicle;
a cabinet having a plurality of sidewalls, the plurality of sidewalls defining at least a portion of an interior region of the cabinet, the cabinet coupled to the vehicle;
a display screen coupled to a portion of the cabinet, at least one side of the display screen positioned to face outwardly away from the interior region, the at least one side of the display screen having indicia that is visible from a location remote from both the cabinet and the vehicle, the indicia providing a visual indication of an operation status of the vehicle;
a light source coupled to the cabinet and positioned adjacent to the display screen, the light source configured to selectively illuminate at least a portion of at least one of the display screen and the indicia;
a controller electrically coupled to the light source; and
a trigger assembly communicatively coupled to the controller, the controller configured to initiate operation of the light source in response to receipt of a communication from the trigger assembly, the communication indicative of a status of the vehicle, the trigger assembly comprising a global position system module and a timer, the controller configured to determine whether data provided by the global position system module satisfies a predetermined threshold for a first predetermined time period, and wherein the controller is further configured to generate a first signal to facilitate operation of the light source upon determination by the controller that the predetermined threshold has been satisfied for the first predetermined time period.

* * * * *